(12) United States Patent
Agrawal et al.

(10) Patent No.: US 11,295,208 B2
(45) Date of Patent: Apr. 5, 2022

(54) ROBUST GRADIENT WEIGHT COMPRESSION SCHEMES FOR DEEP LEARNING APPLICATIONS

(71) Applicant: International Business Machines Corporation, Armonk, NY (US)

(72) Inventors: Ankur Agrawal, White Plains, NY (US); Daniel Brand, Millwood, NY (US); Chia-Yu Chen, Westchester, NY (US); Jungwook Choi, Elmsford, NY (US); Kailash Gopalakrishnan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1157 days.

(21) Appl. No.: 15/830,170

(22) Filed: Dec. 4, 2017

(65) Prior Publication Data

US 2019/0171935 A1 Jun. 6, 2019

(51) Int. Cl.
*G06N 3/08* (2006.01)
*G06N 3/04* (2006.01)

(52) U.S. Cl.
CPC ............. *G06N 3/08* (2013.01); *G06N 3/04* (2013.01)

(58) Field of Classification Search
CPC .......... G06N 3/08; G06N 3/04; G06N 3/0445; G06N 3/084; G06N 3/0454
See application file for complete search history.

(56) References Cited

U.S. PATENT DOCUMENTS 5,926,804 A 7/1999 Tufts et al.
7,088,856 B2 * 8/2006 Lee ..................... G06K 9/4652
348/404.1

(Continued)

FOREIGN PATENT DOCUMENTS

CN 104598972 A 5/2015

OTHER PUBLICATIONS

Model Accuracy and Runtime Tradeoff in Distributed Deep Learning Gupta et al. (Year: 2015).*
(Continued)

*Primary Examiner* — Kakali Chaki
*Assistant Examiner* — Ababacar Seck
(74) *Attorney, Agent, or Firm* — Cantor Colburn LLP; Stosch Sabo

(57) ABSTRACT

Embodiments of the present invention provide a computer-implemented method for adaptive residual gradient compression for training of a deep learning neural network (DNN). The method includes obtaining, by a first learner, a current gradient vector for a neural network layer of the DNN, in which the current gradient vector includes gradient weights of parameters of the neural network layer that are calculated from a mini-batch of training data. A current residue vector is generated that includes residual gradient weights for the mini-batch. A compressed current residue vector is generated based on dividing the residual gradient weights of the current residue vector into a plurality of bins of a uniform size and quantizing a subset of the residual gradient weights of one or more bins of the plurality of bins. The compressed current residue vector is then transmitted to a second learner of the plurality of learners or to a parameter server.

25 Claims, 8 Drawing Sheets

(56) References Cited

U.S. PATENT DOCUMENTS

| | | | |
|---|---|---|---|
| 9,235,799 | B2 | 1/2016 | Yu et al. |
| 9,626,621 | B2 | 4/2017 | Dognin et al. |
| 2017/0098171 | A1 | 4/2017 | Kumar et al. |
| 2018/0075347 | A1* | 3/2018 | Alistarh ............... G06N 3/084 |
| 2018/0107926 | A1* | 4/2018 | Choi ................... G06N 3/063 |
| 2018/0144242 | A1* | 5/2018 | Simard ............... G06N 3/0454 |
| 2018/0268283 | A1* | 9/2018 | Gilad-Bachrach ...... G06F 17/11 |

OTHER PUBLICATIONS

A Reliable Effective Terascale Linear Learning System Gupta et al. (Year: 2014).*
Stochastic Gradient Made Stable: A Manifold Propagation Approach for Large-Scale Optimization Yadong Mu, Member, IEEE, Wei Liu, Member, IEEE, and Wei Fan, Member, IEEE (Year: 2016).*
Deep Residual Learning for Image Recognition He et al. (Year: 2016).*
Communication Quantization for Data-parallel Training of Deep Neural Networks Dryden et al. (Year: 2016).*
Bagherinezhad et al.; "LCNN: Lookup-based Convolutional Neural Network"; University of Washington, Allen Institute for AI; Nov. 2016; 10 pages.
Chen et al.; "Compressing Convolutional Neural Networks in the Frequency Domain"; Cornell University Library; Jun. 14, 2015; 10 pages.
Han et al.; "Learning bothWeights and Connections for Efficient Neural Networks"; Advances in Neural Information Processing Systems 28 (NIPS 2015); 9 pages.
Kadetotad et al.; "Efficient Memory Compression in Deep Neural Networks Using Coarse-Grain Sparsification for Speech Applications"; Proceedings of the 35th International Conference on Computer-Aided Design, Article No. 78; Nov. 7-10, 2016; 8 pages.
Kim et al.; "Audio Computing in the Wild: Frameworks for Big Data and Small Computers" Dissertation—University of Illinois at Urbana-Champaign, 2016; 130 pages.
Lascorz et al.; "Tartan: Accelerating Fully-Connected and Convolutional Layers in Deep Learning Networks By Exploiting Numerical Precision Variability"; Electrical and Computer Engineering University of Toronto, Conference paper at ICLR 2017; 14 pages.
Li et al.; Lecture 4: Backpropagation and Neural Networks; Lecture 4-1; Apr. 13, 2017; 100 pages.
Li et al; "Lecture 3: Loss Functionsand Optimization"; Lecture 3-1; Apr. 11, 2017; 85 pages.
Mell et al.; "The NIST Definition of Cloud Computing—Recommendations of the National Institute of Standards and Technology"; U.S. Department of Commerce; Sep. 2011; 7 pages.
Meng et al.; "Two-Bit Networks for Deep Learning on Resource-Constrained Embedded Devices"; Cornell University Library; Jan. 2, 2017; 2 pages.
Parashar et al.; "SCNN: An Accelerator for Compressed-sparse Convolutional Neural Networks"; ISCA '17, Jun. 24-28, 2017, Toronto, ON, Canada; 14 pages.
Seide et al.; "1 -Bit Stochastic Gradient Descent and its Application to Data-Parallel Distributed Training of Speech DNNs"; Institute of Microelectronics, Tsinghua University, Beijing CN; Interspeech 2014; 5 pages.
PCT International Search Report and Written Opinion; Application No. PCT/IB2018/059516; dated Mar. 27, 2019; 9 pages.
Strom, "Scalable distributed DNN training using commodity GPU cloud computing," Sixteenth Annual Conference of the International Speech Communication Association, 2015, pp. 1488-1492.
UK Examination Report dated Aug. 5, 2020 in GB2009717.6 (6 pages).

* cited by examiner

ROBUST GRADIENT WEIGHT COMPRESSION SCHEMES FOR DEEP LEARNING APPLICATIONS

BACKGROUND

The present invention generally relates to training of deep learning networks, and more specifically, to robust residual gradient compression schemes for deep machine learning applications.

The phrase "machine learning" broadly describes a function of an electronic system that is capable of learning from data. A machine learning system, engine, or module can include a machine learning algorithm that can be trained, such as in an external cloud environment, to learn functional relationships between inputs and outputs, wherein the functional relationships are currently unknown.

SUMMARY

Embodiments of the present invention provide a computer-implemented method for adaptive residual gradient compression for training of a deep learning neural network (DNN). A non-limiting example of the method includes obtaining, by a processor of a first learner of a plurality of learners, a current gradient vector for a neural network layer of the DNN, in which the current gradient vector includes gradient weights of parameters of the neural network layer that are calculated from a mini-batch of training data. A current residue vector is generated that includes residual gradient weights for the mini-batch, in which generating the current residue vector includes the summation of a prior residue vector and the current gradient vector. A compressed current residue vector is generated, in which the compressed current residue vector is generated based at least in part on dividing the residual gradient weights of the current residue vector into a plurality of bins of a uniform size and quantizing a subset of the residual gradient weights of one or more bins of the plurality of bins. The quantizing of the subset of the residual gradient weights is based at least in part on calculating a scaling parameter for the mini-batch and calculating a local maximum of each bin, in which the uniform size of the bins is a hyper-parameter of the DNN. The compressed current residue vector is then transmitted to second learner of the plurality of learners.

Embodiments of the present invention provide a system for adaptive residual gradient compression for training of a DNN. In some embodiments of the present invention, the system includes a plurality of learners, in which at least a first learner of the plurality of learners is configured to perform a method. A non-limiting example of the method includes obtaining a current gradient vector for a neural network layer of the DNN, in which the current gradient vector includes gradient weights of parameters of the neural network layer that are calculated from a mini-batch of training data. A current residue vector that includes residual gradient weights for the mini-batch is generated, in which generating the current residue vector includes summing a prior residue vector and the current gradient vector. A compressed current residue vector is generated, in which the compressed current residue vector is generated based at least in part on dividing the residual gradient weights of the current residue vector into a plurality of bins of a uniform size and quantizing a subset of the residual gradient weights of one or more bins of the plurality of bins. The quantizing of the subset of the residual gradient weights is based at least in part on calculating a scaling parameter for the mini-batch and calculating a local maximum of each bin, in which the uniform size of the bins is a hyper-parameter of the DNN. The compressed current residue vector is then transmitted by the processor to a second learner of the plurality of learners.

Embodiments of the invention provide a computer program product for adaptive residual gradient compression for training of a DNN, the computer program product having a computer readable storage medium having program instructions embodied therewith. The program instructions are executable by a processor of at least a first learner of a plurality of learners to cause the first learner to perform a method. A non-limiting example of the method includes obtaining a current gradient vector for a neural network layer of the DNN, in which the current gradient vector includes gradient weights of parameters of the neural network layer that are calculated from a mini-batch of training data. A current residue vector is generated that includes residual gradient weights for the mini-batch, in which generating the current residue vector includes the summation of a prior residue vector and the current gradient vector. A compressed current residue vector is generated, in which the compressed current residue vector is generated based at least in part on dividing the residual gradient weights of the current residue vector into a plurality of bins of a uniform size and quantizing a subset of the residual gradient weights of one or more bins of the plurality of bins. The quantizing of the subset of the residual gradient weights is based at least in part on calculating a scaling parameter for the mini-batch and calculating a local maximum of each bin, in which the uniform size of the bins is a hyper-parameter of the DNN. The compressed current residue vector is then transmitted to a second learner of the plurality of learners.

Embodiments of the present invention provide a computer-implemented method for training a DNN via adaptive residual gradient compression. A non-limiting example of the method includes receiving, by a system having a plurality of learners, training data for training of the DNN using one or more neural network layers. A current gradient vector for a neural network layer is generated at each learner of the plurality of learners from a mini-batch of the training data, in which the current gradient vector includes gradient weights of parameters of the neural network layer that are calculated from a mini-batch of training data. A current residue vector is generated at each learner of the plurality of learners from the mini-batch, in which generating the current residue vector includes summing a prior residue vector and the current gradient vector. A compressed current residue vector is generated at each leaner of the plurality of learners, in which the compressed current residue vector is generated based at least in part on dividing the residual gradient weights of the current residue vector into a plurality of bins of a uniform size and quantizing a subset of the residual gradient weights of one or more bins of the plurality of bins. The quantizing of the subset of the residual gradient weights is based at least in part on calculating a scaling parameter for the mini-batch and calculating a local maximum of each bin, in which the uniform size of the bins is a hyper-parameter of the DNN. The compressed current residue vectors are then exchanged among the plurality of learners. The compressed current residue vectors are decompressed at each of the plurality of learners. The gradient weights of the parameters of the neural network layer are then updated at each of the plurality of learners.

Embodiments of the present invention provide a system for training a deep learning neural network (DNN) via adaptive residual gradient compression. In some embodiments of the present invention, the system includes a plurality of learners, in which the system is configured to perform a method. A non-limiting example of the method includes receiving, by the system, training data for training of the DNN using one or more neural network layers. A current gradient vector for a neural network layer is generated at each learner of the plurality of learners from a mini-batch of the training data, in which the current gradient vector includes gradient weights of parameters of the neural network layer that are calculated from a mini-batch of training data. A current residue vector is generated at each learner of the plurality of learners from the mini-batch, in which generating the current residue vector includes the summation of a prior residue vector and the current gradient vector. A compressed current residue vector is generated at each leaner of the plurality of learners, in which the compressed current residue vector is generated based at least in part on dividing the residual gradient weights of the current residue vector into a plurality of bins of a uniform size and quantizing a subset of the residual gradient weights of one or more bins of the plurality of bins. The quantizing of the subset of the residual gradient weights is based at least in part on calculating a scaling parameter for the mini-batch and calculating a local maximum of each bin, in which the uniform size of the bins is a hyper-parameter of the DNN. The compressed current residue vectors are then exchanged among the plurality of learners. The compressed current residue vectors are decompressed at each of the plurality of learners. The gradient weights of the parameters of the neural network layer are then updated at each of the plurality of learners.

Additional technical features and benefits are realized through the techniques of the present invention. Embodiments and aspects of the invention are described in detail herein and are considered a part of the claimed subject matter. For a better understanding, refer to the detailed description and to the drawings.

This compression scheme could integrate with different training scheme (time-domain) and applied in different layers (space-domain). For example, the compression scheme is not applied first few epochs or the last and first layers of neural networks.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
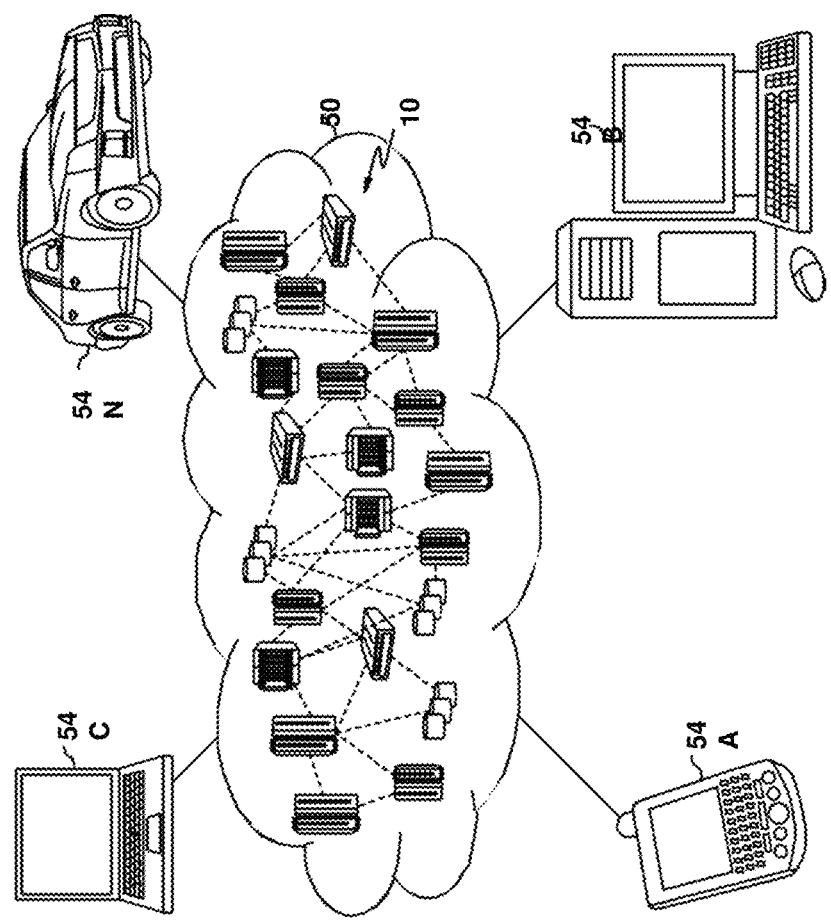
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, a process, a method, an article, or an apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e.

two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
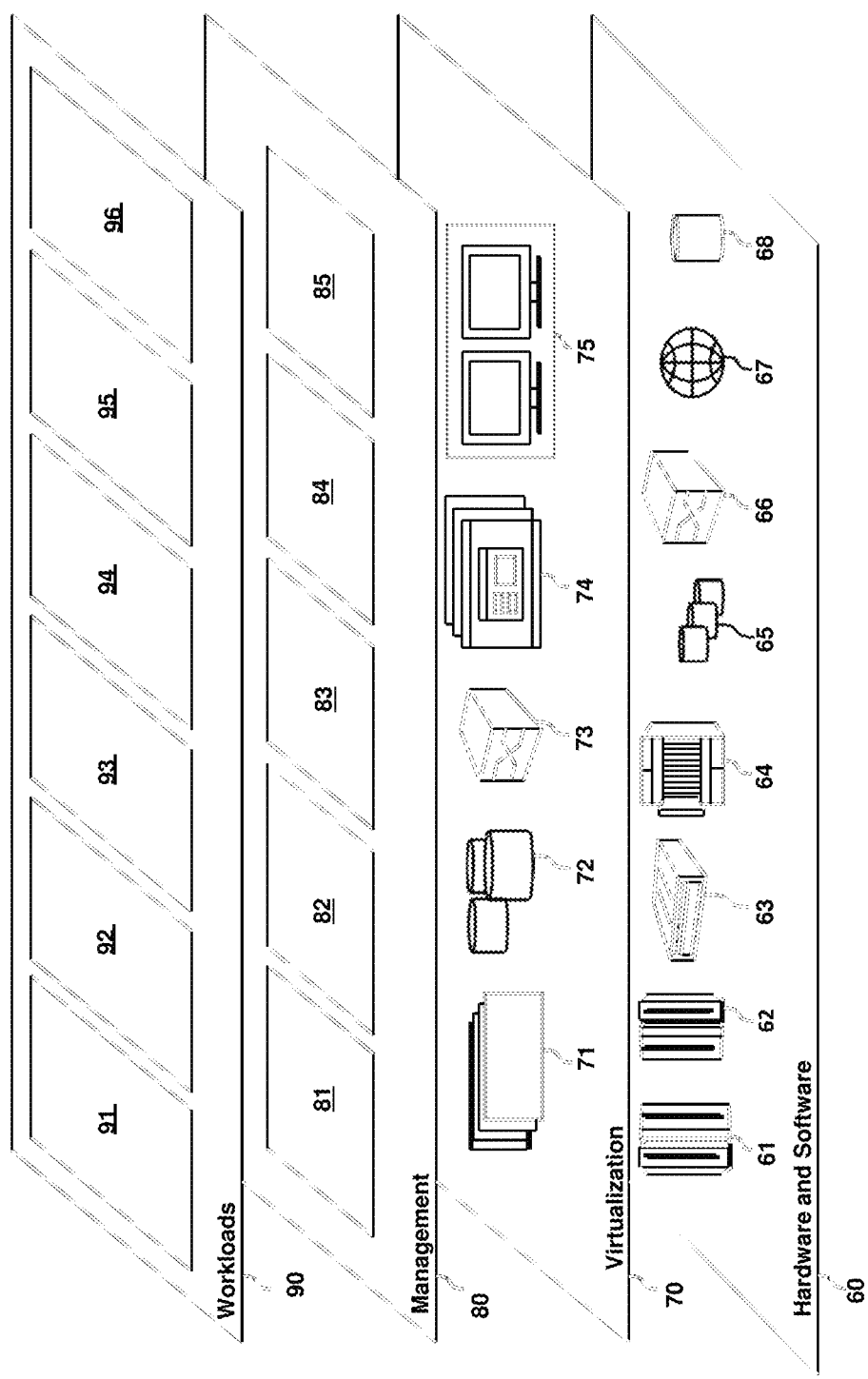
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and gradient compression processing 96.

Turning now to an overview of technologies that are more specifically relevant to aspects of the invention, highly distributed training of DNNs are often communication constrained. To overcome this limitation, new gradient compression techniques are needed that are computationally friendly, applicable to a wide variety of layers seen in DNN, and adaptable to variations in network architectures as well as their hyper-parameters.

As previously noted herein, the phrase "machine learning" broadly describes a function of electronic systems that learn from data. A machine learning system, engine, or module can include a trainable machine learning algorithm that can be trained, such as in an external cloud environment, to learn functional relationships between inputs and outputs, wherein the functional relationships are currently unknown.

Machine learning functionality can be implemented using an artificial neural network (ANN) having the capability to be trained to perform a currently unknown function. In machine learning and cognitive science, ANNs are a family of statistical learning models inspired by the biological neural networks of animals, in particular the brain. ANNs can be used to estimate or approximate systems and functions that depend on a large number of inputs. ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based, at least in part, on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Machine learning is often employed by numerous technologies to determine inferences and/or relationships among digital data. For example, machine learning technologies, signal processing technologies, image processing technologies, data analysis technologies, and/or other technologies employ machine learning models to analyze digital data, process digital data, determine inferences from digital data, and/or determine relationships among digital data.

A deep neural network (DNN) is a type of ANN that has multiple hidden layers between the input and output layers. DNNs can model complex non-linear relationships. DNN architectures generate compositional models where the object is expressed as a layered composition of primitives. The extra layers enable composition of features from lower layers, potentially modeling complex data with fewer units than a similarly performing shallow network. Some DNNs are feedforward networks in which data flows from the input layer to the output layer without looping back. Recurrent neural networks (RNNs) are a further type of DNN, in which data can flow in any direction. RNNs are sometimes used for applications such as language modeling. Long short-term memory (LSTM) networks are another type of DNN.

The use of neural networks, particularly with convolutional layers, has driven progress in deep learning. Such neural networks are referred to as convolutional neural networks (CNN). In a CNN, kernels convolute overlapping regions in a visual field, and accordingly emphasize the importance of spatial locality in feature detection. Computing the convolutional layers of the CNN typically encompasses more than 90% of computation time in neural network training and inference. The training time, for example, depends on the size of the training dataset that is being used, may be a week or longer. In order to improve training time over single-node systems, distributed systems have been developed to distribute training data over multiple central processing units (CPUs) or graphics processing units (GPUs). Ring-based system topologies have been proposed to attempt to maximize inter-accelerator bandwidths by connecting accelerators and/or learners in the system in a ring network. The accelerator then transports its computed weight gradients from local mini-batch directly to the adjacent accelerator or with a centralized parameter server. However, as the number of learners that are utilized increases, distribution of the mini-batch data under strong scaling conditions has the adverse effect of significantly increasing the demand for communication bandwidth between the learners while proportionally decreasing the flops needed in each learner, therefore, creating a severe computation to communication imbalance. Thus, accelerating the CNN training via compression, as described by the examples of the technical solutions herein, is a desirable improvement.

Turning now to an overview of the aspects of the invention, one or more embodiments of the invention addresses the above-described shortcomings of the prior art by providing a new compression technique that assists in minimizing the amount of data exchanged among accelerators. In particular, an adaptive residual gradient compression scheme is provided that utilizes localized selection of gradient residues, in which the residual gradient compression scheme is able to automatically tune the compression rate based on local activity. For example, as there may be a lack of correlation between the activity of input features and the residual gradients in any layer, in some embodiments of the present invention, the compression scheme is configured to capture the residues across an entire layer by dividing the entire residue vector, for each layer, uniformly into several bins, thus creating a new hyper-parameter having a fixed length bin size, $L_T$. In each bin, the compression algorithm first finds the maximum of the absolute value of the residue. In addition to this value, the compression algorithm sends other residues that are relatively similar in magnitude to this maximum. A residue is computed for each mini-batch as the sum of the previous residue and the latest gradient value obtained from backpropagation. If the sum of its previous residue plus its latest gradient, with a scale-factor, exceeds the maximum in the bin, then those additional residues are included in the set of values to be sent and/or centrally updated. Various suitable scale factors may be used in accordance with one or more embodiments of the present invention. For example, in some embodiments of the present invention the scale-factor ranges from about 1.5 to about 3. In some embodiments of the present invention, the scale-factor is 2.

As residues may be empirically larger than gradients, one or more of the above-described aspects of the invention address the shortcomings of the prior art by providing a compression scheme that allows for the sending of important residues that are close to a local maximum. By quantizing a compressed residue vector in accordance to one or more embodiments of the present invention, the overall compression rate can be increased. The compression scheme can be applied to every layer separately at each learner. In some embodiments of the present invention, each learner sends a scale-factor in addition to the compressed sparse vector. In some embodiments of the present invention, by exploiting both sparsity and quantization, end-to-end compression rates of about 200× for fully-connected and recurrent layers and 40× for convolution layers may be achieved without noticeable degradation in model accuracy (e.g., <1% degradation). Prior methods had significant degradation, such as about 1.6% for large networks. In one or more embodiments of the present invention, the compression scheme does not require sorting, or approximation to sorting, and thus the compression scheme is able to be computably efficient (O)(N)) for high-performance systems.

Figure 3:
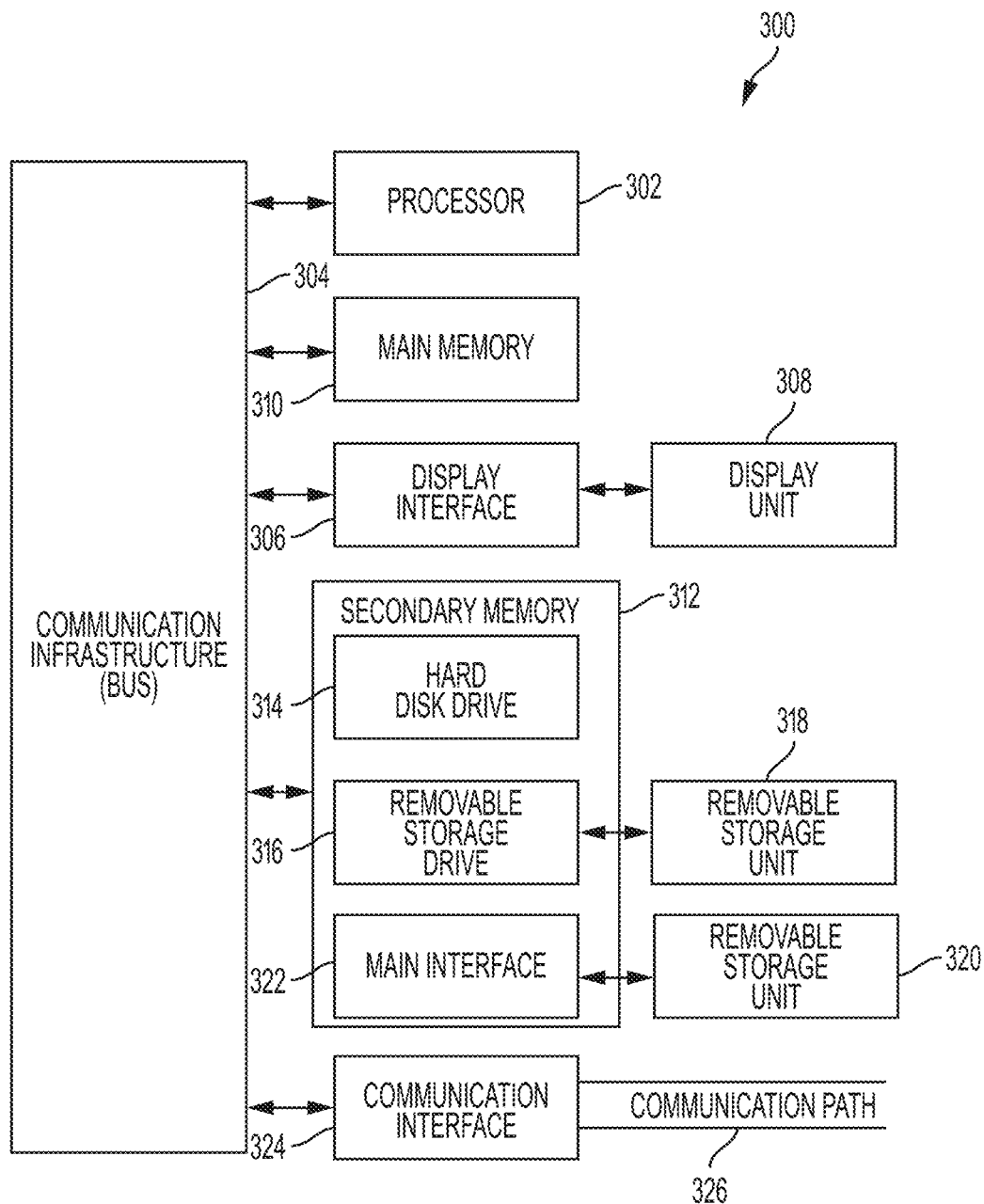
FIG. 3 depicts an exemplary computer system capable of implementing one or more embodiments of the present invention.

Turning now to a more detailed description of aspects of the present invention, FIG. 3 illustrates a high level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional system are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

Figure 4:
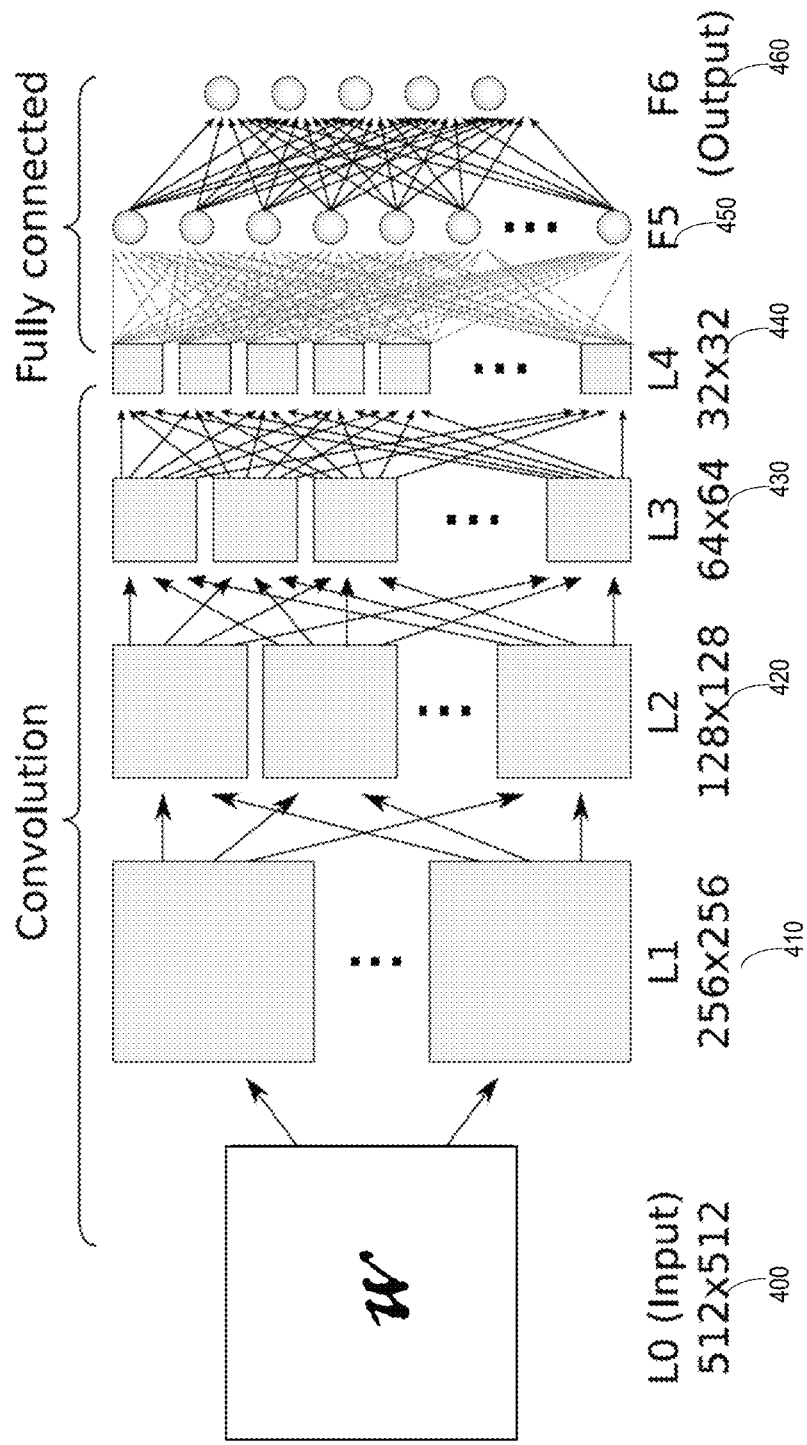
FIG. 4 depicts a simplified block diagram of a convolutional neural network in accordance with one or more embodiments of the present invention.

FIG. 4 illustrates a block diagram of an example neural network in accordance with one or more embodiments of the present disclosure, which is interpreting a sample input map 400. This particular example uses a handwritten letter "w" as an input map, however, it is understood that other types of input maps are possible. In the illustrated example, the input map 400 is used to create a set of values for the input layer 410, or "layer-1." In some embodiments of the present invention, layer-1 is generated by direct mapping of a pixel of the sample input map 400 to a particular neuron in layer-1, such that the neuron shows a 1 or a 0 depending on whether the pixel exhibits a particular attribute. Another example method of assigning values to neurons is discussed below with reference to convolutional neural networks. Depending on the vagaries of the neural network and the problem it is created to solve, each layer of the network may have differing numbers of neurons, and these may or may not be related to particular qualities of the input data.

Referring to FIG. 4, neurons in layer-1 410 are connected to neurons in the next layer, layer-2 420. In a neural network, each of the neurons, in a particular layer, is connected to neurons in the next layer. In this example, a neuron in layer-2 receives an input value from each of the neurons in layer-1. The input values are then summed and this sum is compared to a bias. If the value exceeds the bias for a particular neuron, that neuron then holds a value which can be used as input to neurons in the next layer of neurons. This computation continues through the various layers 430-450 of the neural network, until it reaches a final layer 460, referred to as "output" in FIG. 4. In an example of a neural network used for character recognition, each value in the layer is assigned to a particular character. In some embodiments of the present invention, the network is configured to end with the output layer having only one large positive value in one neuron, which then demonstrates which character the network has computed to be the most likely handwritten input character.

In some embodiments of the present invention, data values for each layer in the neural network are represented as vectors or matrices (or tensors in some examples) and computations are performed as vector or matrix computations. The indexes (and/or sizes) of the matrices vary from layer to layer and network to network, as illustrated in FIG. 4. Different implementations orient the matrices, or map the matrices, to computer memory differently. In the example neural network illustrated in FIG. 4, each level is a matrix of neuron values by matrix dimensions for each layer of the neural network. The values in a matrix at a layer are multiplied by connection strengths, which are in a transformation matrix. This matrix multiplication scales each value in the previous layer according to the connection strengths, and then is summed. A bias matrix is then added to the resulting product matrix to account for the threshold of each neuron in the next level. An activation function is then applied to each resultant value, and the resulting values are placed in the matrix for the next layer. In an example, the activation function may be rectified linear units, sigmoid, or tan h( ). The connections between each layer, and thus an entire network, can be represented as a series of matrices. Training the neural network includes finding proper values for these matrices.

While fully-connected neural networks are able, when properly trained, to recognize input patterns, such as handwriting, they may fail to take advantage of shape and proximity when operating on input. For example, because every pixel is operated on independently, the neural network may ignore adjacent pixels. A CNN, in comparison, operates by associating an array of values, rather than a single value, with each neuron. Conceptually, the array is a subset of the input pattern, or other parts of the training data. The transformation of a neuron value for the subsequent layer is generated using convolution. Thus, in a CNN the connection strengths are convolution kernels rather than scalar values as in a full-network.

Figure 5:
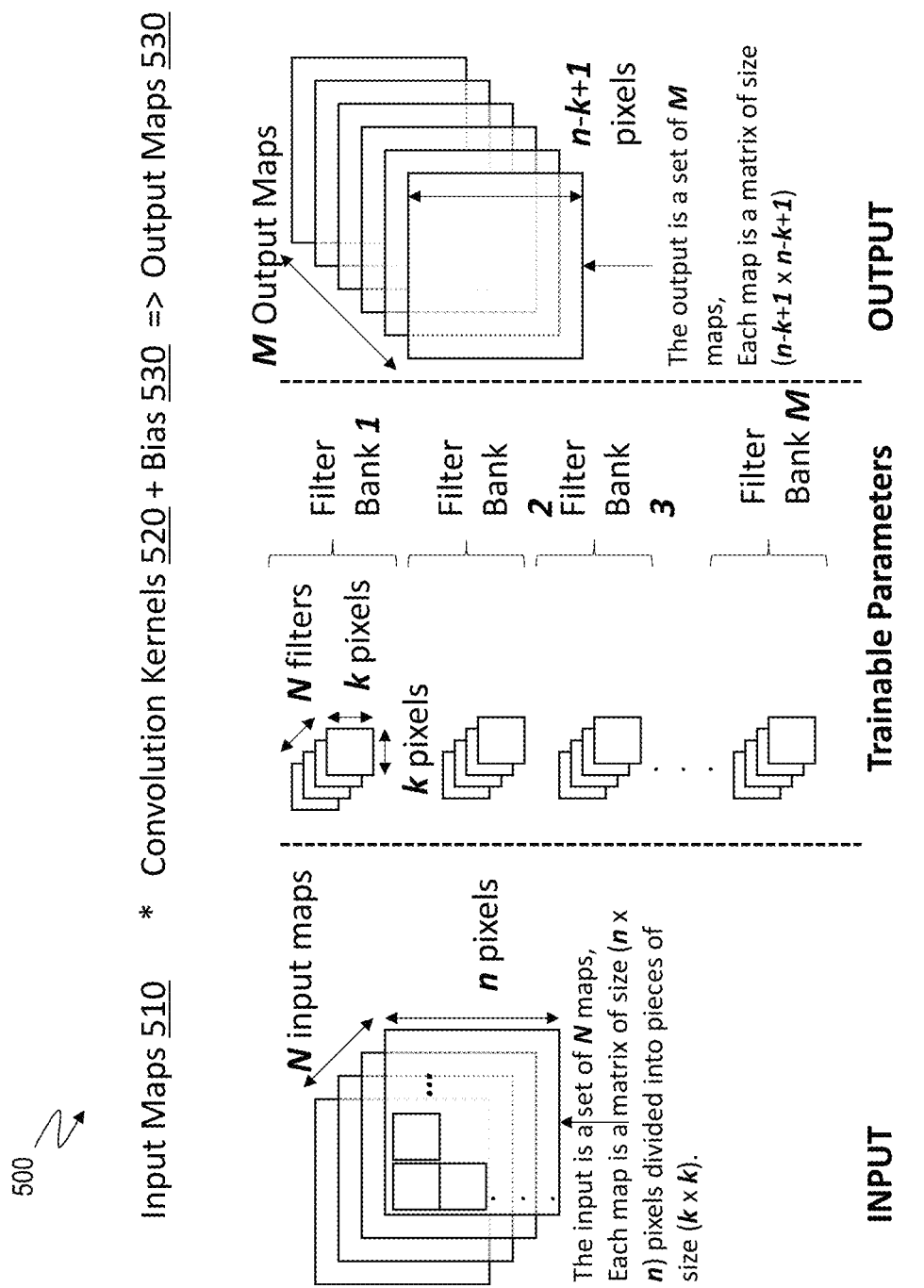
FIG. 5 depicts an example convolution layer of a neural network that is being trained using training data in accordance with one or more embodiments of the present invention.

FIG. 5 illustrates an example convolutional layer 500 in a CNN being trained using training data that includes input maps 510 and convolution kernels 520, in accordance with one or more embodiments of the present invention. The input maps 510 include multiple input patterns, for example N input maps. Each input map is a matrix, such as a square matrix of size n×n. The input maps are convolved with convolution kernels 520 of size k×k as illustrated to produce M output maps 530 of size n−k+1×n−k+1. Each convolution is a 3D convolution involving the N input maps. It should be noted that the input maps, kernels, and output maps need not be square. A CNN can include multiple such layers, where the output maps 530 from a previous layer are used as input maps 510 for a subsequent layer. The backpropagation algorithm can be used to learn the weight values of the k×k×M×N filters.

For example, in some embodiments of the present invention, the input maps 510 are convolved with each filter bank to generate a corresponding output map. For example, in case the CNN 500 is being trained to identify handwriting, the input maps 510 are combined with a filter bank that includes convolution kernels representing a vertical line. The resulting output map 530 identifies vertical lines which may be present in the input maps 510. Further, another filter bank may include convolution kernels representing a diagonal line, such as going up and to the right. An output map 530 resulting from a convolution of the input maps 510 with the second filter bank identifies samples of the training data that contain diagonal lines. The two output maps 530 show different information for the character, while preserving pixel adjacency. This can result in more efficient character recognition.

Figure 6:
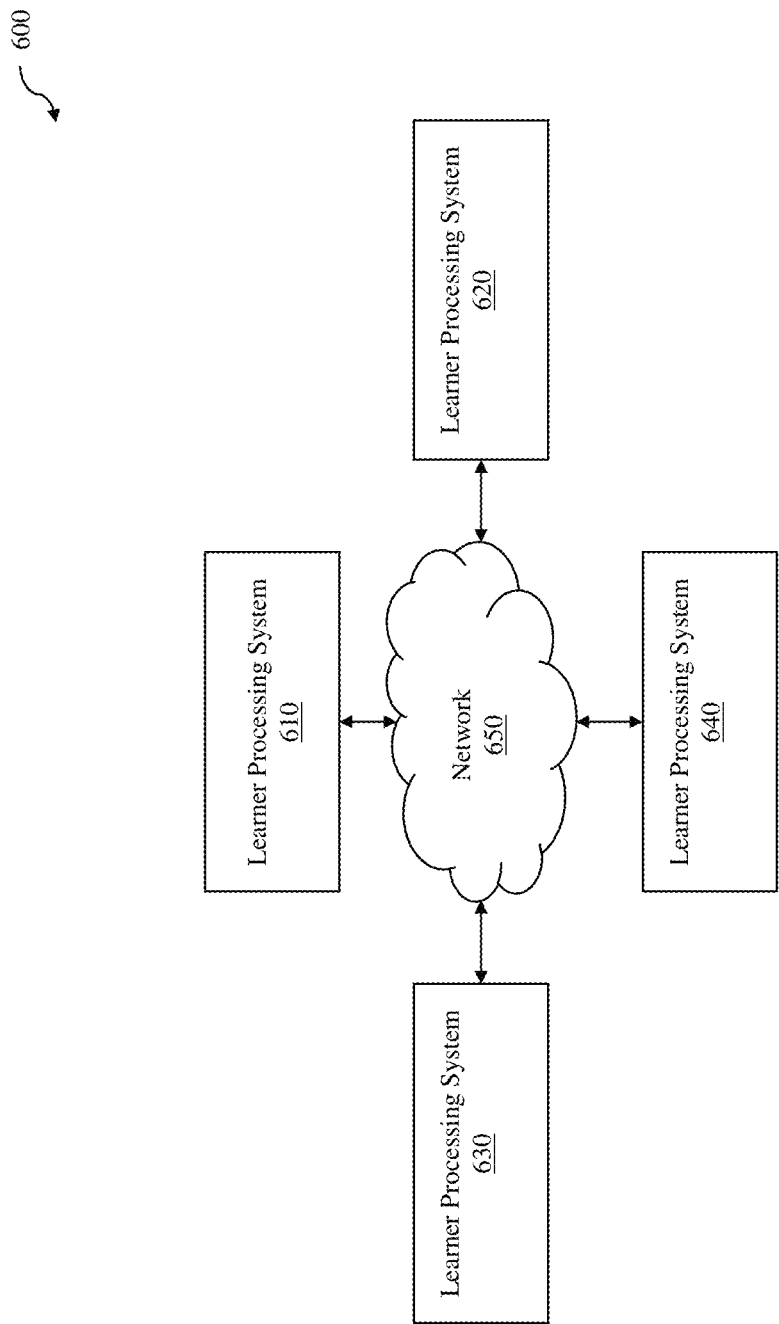
FIG. 6 depicts a block diagram of an environment for performing adaptive residual gradient compression for training of a deep learning neural network in accordance with one or more embodiments of the present invention.
Figure 7:
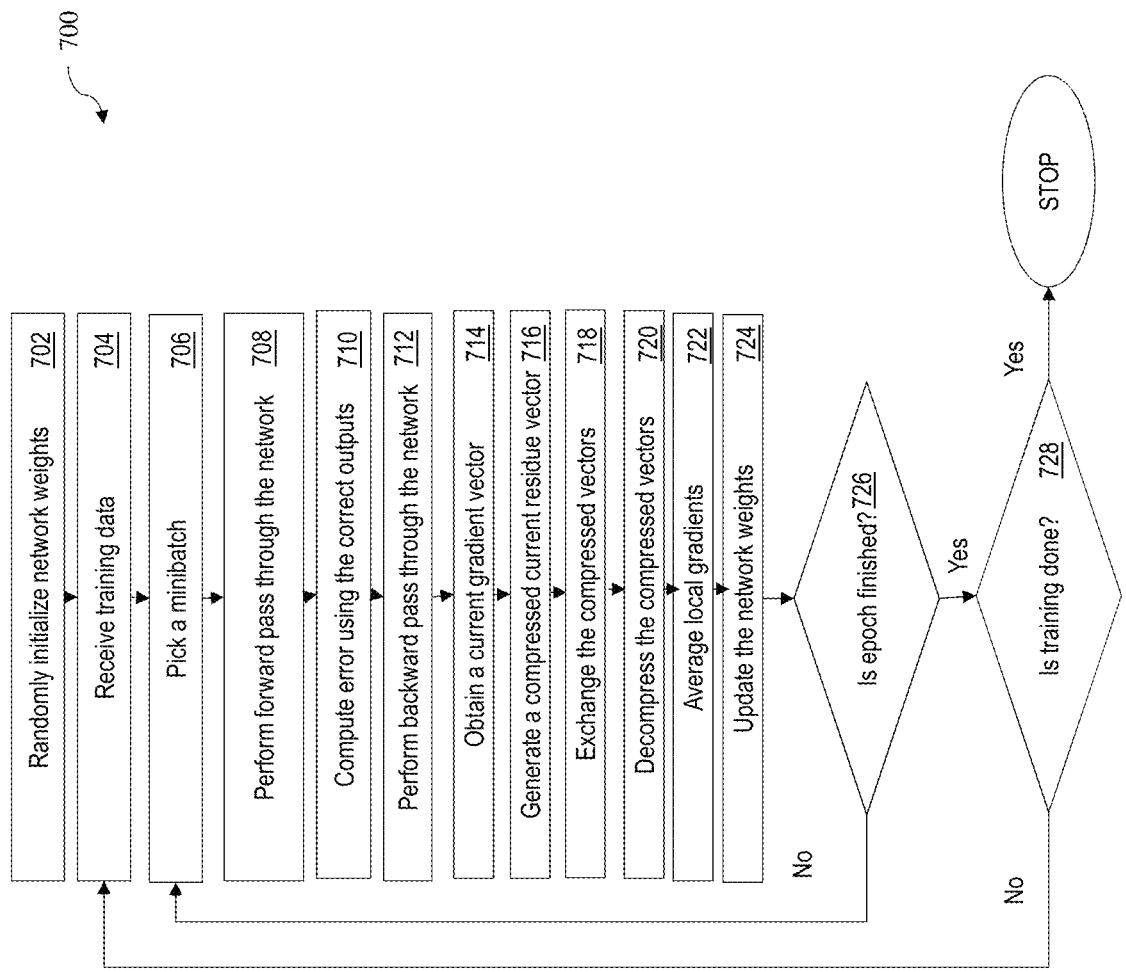
FIG. 7 depicts an example flowchart for training a neural network in accordance with one or more embodiments of the present invention.

FIG. 6 illustrates a block diagram of a system 600 for performing adaptive residual gradient compression for training of a deep learning neural network according to one or more embodiments of the present invention. System 600 includes a plurality of learner processing systems 610, 620, 630, 640 which are responsible for preforming deep network learning, for example, as an instance of a non-convex optimization problem. This may be useful to train deep neural nets with a large number of parameters on large datasets. For example, in some embodiments of the present invention, when multi-workers (e.g., plurality of learner processing systems 610, 620, 630, 640) train one neural network, each worker computes a subset of training data and communication among workers may be required; this is usually called data-parallelism. To save communication bandwidth, each worker sends partial value of gradients and keep the reminding residues locally. System 600 provides a compression technique that assists in minimizing the amount of data exchanged among accelerators. In particular, system 600 employs an adaptive residual gradient compression scheme that utilizes localized selection of gradient residues, in which the compression scheme is configured to capture the residues across an entire layer by dividing the entire residue vector for each layer uniformly into several bins, wherein the fixed length bin size, $L_T$, is a new hyper-parameter. In each bin, the maximum of the absolute value of the residue is identified and exchanged among the plurality of learner processing systems 610, 620, 630, 640 and/or transmitted to a parameter server. Other residues that are relatively similar in magnitude to this maximum are also exchanged among the plurality of learner processing systems 610, 620, 630, 640 and/or transmitted to a parameter server. For example, in some embodiments of the present invention, a residue that is computed for each mini-batch by summing a previous residue and a latest gradient value obtained from backpropagation. If the sum of its previous residue plus its latest gradient, with a scale-factor, exceeds the maximum in the bin, those additional residues are included in the set of values to be sent and/or centrally updated at a server, such as a parameter server. It should be appreciated that, although four learner processing systems 610, 620, 630, 640 are illustrated in FIG. 6, the present techniques may be utilized with any suitable number of learner processing systems. In some embodiments of the present invention, when multi-workers (e.g., plurality of learner processing systems 610, 620, 630, 640) train one neural network, each worker computes the subset of training data and communication among workers are required; this is usually called data-parallelism. To save communication bandwidth, each worker sends partial value of gradients and keep the reminding residues locally FIG. 7 illustrates an example process flow 700 for training a DNN, such as a CNN with one or more convolutional layers 500 in accordance with one or more embodiments of the present invention. The example logic may be implemented by one or more processors, such as a CPU, a GPU, a digital signal processor (DSP), or any other processor or a combination thereof. At 702, the CNN is initialized. In some embodiments of the present invention, the CNN is initialized with random weights. At 704, training data for the CNN 500 is received. In some embodiments of the present invention, the CNN is pre-set with sample convolutional kernels and biases, which can be refined to provide consistent and efficient results. In some embodiments of the present invention, the training data includes a plurality of input training samples 400 such as for example, on the order of tens of thousands of input training samples 400. The input training samples 400 are associated with an expected output 460. In some embodiments of the present invention, the inputs 400 are handwriting samples and the expected outputs 460 are an indication of the correct character for interpreting each handwriting sample.

In some embodiments of the present invention, DNN training includes training via multiple training epochs. For example, in some embodiments of the present invention, each epoch includes several mini-batches. Accordingly, in some embodiments of the present invention, as shown at block 706 the process begins at a mini-batch of a training epoch by receiving training data (e.g., by learner processing systems 610, 620, 630, 640). Using the input maps 510 and the convolutional kernels 520, the output maps 530 are generated as described herein, as shown at block 708 (e.g., by learner processing systems 610, 620, 630, 640). Generating the output maps 530 is commonly referred to as a "forward pass." At 710, a determination is made, based on the output maps 530, as to how close or far off of the CNN was to the expected. At block 712, the degree of error with relation to each of the matrices and/or vectors that make up the CNN is determined using gradient descent. Determining the relative errors is referred to as a "backward pass" (e.g., by learner processing systems 610, 620, 630, 640).

At block 714, a current gradient vector is obtained on a layer-by-layer basis by each learner of the system (e.g., by learner processing systems 610, 620, 630, 640). In some embodiments of the present invention, the current gradient vector for each given neural network layer includes gradient weights of parameters of the given neural network layer. As will be discussed in further detail below, in some embodiments of the present invention, the gradient weights are calculated from a mini-batch of training data as opposed to from the entire training data.

At block 716, a current residue vector and a compressed current residue vector are generated for each given layer by each learner of the system (e.g., by learner processing systems 610, 620, 630, 640). In some embodiments of the present invention, the compressed current residue vector is a layer-wise or chunk-wise compressed current residue vector. In some embodiments of the present invention, the current residue vector includes residual gradient weights for a given layer of a mini-batch. In some embodiments of the present invention, the current residue vector is generated by summing the current gradient vector with a prior residue vector (e.g., a residue vector of a prior mini-batch). In some embodiments of the present invention, the prior residue vector is an empty vector or has null values, which may occur when a run is first initialized. As such, in some embodiments of the present invention, the summation of the current gradient vector and a prior residue vector results in a current residue vector being obtained that is the same as the current gradient vector.

In some embodiments of the present invention, the compressed current residue vector that is generated at block 716 is generated based, at least in part, on dividing the residual gradient weights of the current residue vector into a plurality of bins, of a uniform size, and then quantizing a subset of the residual gradient weights of one or more bins of the plurality of bins, in which the uniform size is a hyper-parameter of the neural network. In some embodiments of the present invention, the quantizing of the subset of the residual gradient weights is based at least in part on calculating a scaling parameter for the mini-batch and calculating a local maximum of each bin.

At block 718, the compressed current residue vectors are exchanged among each learner of the system (e.g., by learner processing systems 610, 620, 630, 640) and/or transmitted to a parameter server. In some embodiments of the present invention, the exchange includes each learner of the system transmitting the compressed current residue vector to the other learners of the plurality of learners. At block 720, the compressed current reduce vectors are decompressed at each learner of the plurality of learns (e.g., by learner processing systems 610, 620, 630, 640). After decompression, at block 722 each learner of the plurality of learners locally averages the gradients of the decompressed vectors (e.g., by learner processing systems 610, 620, 630, 640).

In some embodiments of the present invention, the matrices are then modified to adjust for the error, as shown at block 724 based on the decompressed vectors. For example, in some embodiments of the present invention, the convolution kernels 520 are modified based on the output error information and then the modified kernels are used to determine modifications for each neural network matrix, which is referred to as an "update pass." In some embodiments of the present invention, the modified convolutional kernels 520, after being adjusted, are used for a next mini-batch or epoch of the training, unless the training is deemed completed, as shown at block 726. In some embodiments of the present invention, the modified convolutional kernels 520 from one mini-batch are used in a subsequent mini-batch. For example, the training may be deemed completed if the CNN identifies the inputs according to the expected outputs with a predetermined error threshold. If the training is not yet completed, another training epoch, is performed using the modified convolutional kernels.

In some embodiments of the present invention, each iteration of the "forward and backward pass" uses the entire training data. Alternatively, the training data may be divided into mini-batches, or subsets. In a batched training process, the CNN is propagated on a forward pass to determine an output for a mini-batch, as shown at block 708. The error function is used to compute how far off the CNN was from the expected output for the batch, as shown at block 710. A gradient function is determined for the error function. The gradient function, in an example, includes partial derivatives for each entry of each neural network matrix with respect to the error. The gradient function represents how much to adjust each matrix according to the gradient descent method. The processor subsequently modifies the matrices, including the convolutional kernels and the biases, according to the gradient function, as shown at block 724. As shown at block 728, the "forward/backward passes" are repeated as long as there are more mini-batches and/or the CNN is not trained. The mini-batch may include any fraction of the total number of input samples needed to complete a training epoch.

Figure 8:
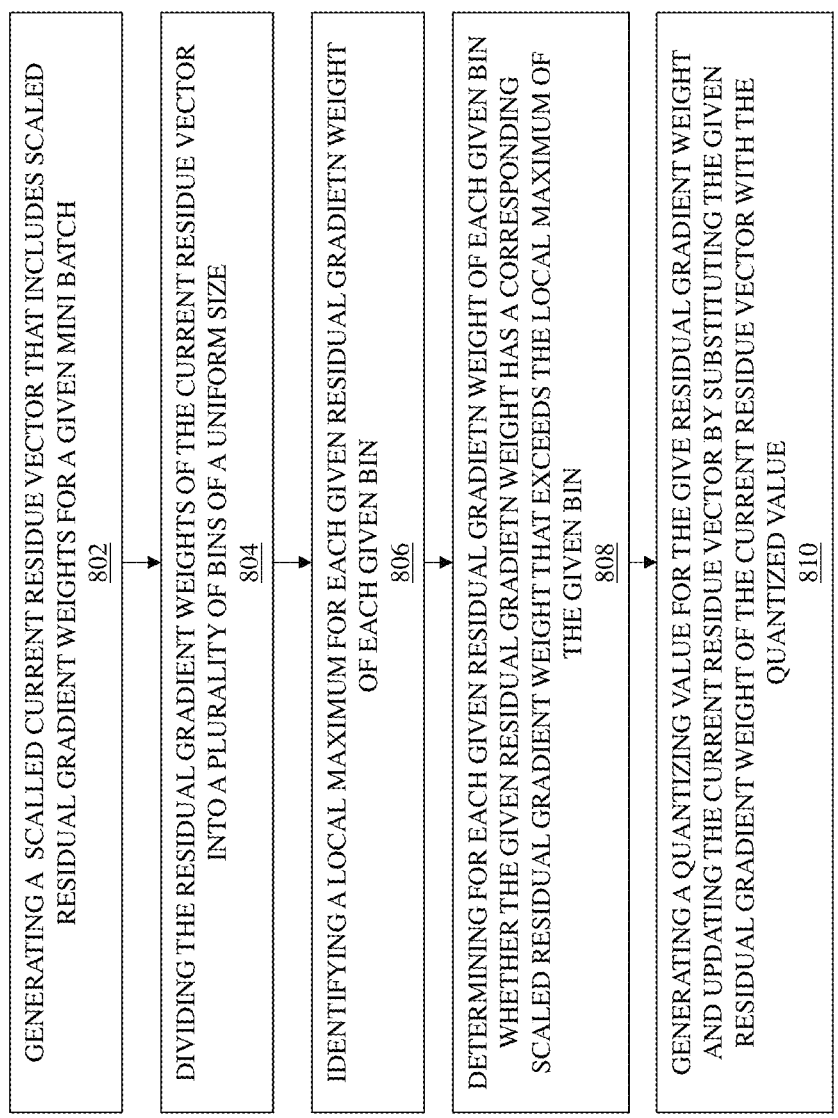
FIG. 8 depicts a flow diagram illustrating an example methodology for generating a compressed current residue vector in accordance with one or more embodiments of the present invention.

FIG. 8 illustrates example logic of block 716 for generating a compressed current residue vector in accordance with one or more embodiments of the present invention. At block 802, a scaled current residue vector is generated at each learner of the system. The scaled current residue vector includes scaled residual gradient weights for the given mini-batch. The scaled current residue vector is generated by multiplying the current gradient vector by a scaling parameter and then summing the prior residue vector with the multiplied gradient vector. In some embodiments of the present invention, the scale parameter is calculated by minimizing quantization error according to L2 normalization.

At block 804, the residual gradient weights of the current residue vector are dividing uniformly into a plurality of bins of a uniform size, in which the uniform size is a hyper-parameter of the neural network. At block 806, a local maximum is identified for each given residual gradient weight of each given bin. In some embodiments of the present invention, the local maximum of a given bin is the maximum absolute value of the residual gradient weights of the given bin.

At block 808, it is determined for each given residual gradient weight of each given bin whether the given residual gradient weight has a corresponding scaled residual gradient weight that exceeds the local maximum of the given bin. At block 810, upon determining that a residual gradient weight that has a corresponding scaled residual gradient weight exceeds the local maximum of the given bin, a quantizing value for the give residual gradient weight is generated and the current residue vector is updated. In some embodiments of the present invention, the current residue vector is updated by substituting the given residual gradient weight of the current residue vector with the quantized value. At block and then updating the current residue vector by substituting the given residual gradient weight of the current residue vector with the quantized value.

The following pseudocode describes two algorithms that can be used to implement process flow 700:

| Algorithm 1 Computation Steps | |
|---|---|
| learningNoUpdate ( ) | ▷ Forward/Backward only |
| serializeGrad ( ) | ▷ Collect grad of each layer as a vector |
| pack ( ) | ▷ AdaComp Compression for each layer |
| exchange ( ) | ▷ Learner receives packed grads from others |
| unpack ( ) | ▷ AdaComp Decompression for each layer |
| averageGradients ( ) | ▷ Average among all learners |
| updateWeights ( ) | ▷ Performed locally at each learner |

| Algorithm 2 Details of packs( ) |
|---|
| G ← residue + dW         ▷ dW is from serializeGrad ( ) |
| H ← G + dW               ▷ H = Residue + 2*dW |
| Divide G into bins of size T |
| for i ← 1, length(G)/T do                    ▷ Over all bins |
|    Calculate $g_{max}$(i);    ▷ Get largest absolute value in each bin |
| end for |
| for i ← 1, length(G)/T do                    ▷ Over all bins |
|   for j ← 1, T do                  ▷ Over all indices within each bin |
|     index ← (i − 1) * T + j |
|     if | H(index) |≥ $g_{max}$(i) then ▷ Compare to local max |
|       Gq(index) ← Quantize(G(index)) |
|       add Gq(index) to a pack vector (sent in exchange( )) |
|       residue(index) ← G(index) − Gq(index) |
|     else |
|       residue(index) ← G(index)     ▷ No transmission |
|     end if |
|   end for |
| end for |

Algorithm 1 shows an example gradient weight communication scheme in accordance with one or more embodiments of the present invention. Algorithm 2 shows an example compression scheme in accordance with one or more embodiments of the present invention (referred to in shorthand as "AdaComp"). Algorithm 1 is a gradient weight communication scheme that can be used to test the compression algorithm of Algorithm 2. Algorithm 2 is encapsulated within the pack( ) and unpack( ) functions of Algorithm 2. These two functions may be inserted between the backward pass step 712 and the weight-update step 722 of process flow 700, for example. The pack/unpack functions can be implemented independent of the exchange( ) function. The exchange( ) function used may depend on the particular topology of the CNN (e.g., ring-based vs. parameter-server based).

Algorithm 2 provides one example of a quantization function that may be utilized within the compression scheme. A sign bit is used with a scale value to represent an original number. In this example, a single scale value is used for each given layer in which the scale value is the absolute value average of all elements in a game vector for the given layer. Other suitable quantization functions and/or scale values may be utilized in one or more embodiments of the present invention.

In some embodiments of the present invention, Algorithm 2 selects up to 10 and 100 elements respectively within each bin through sparsity for bin sizes ($L_T$) between 50 and 500 elements. In some embodiments of the present invention, a sparse-index representation of 8-bits is used for $L_T$ sizes that are less than 40 elements. In some embodiments of the present invention, a 16-bit representation is used for large $L_T$ sizes (e.g., greater than 500 elements and/or up to 10K elements). In some embodiments of the present invention, 2-bits of an 8-bit or 16-bit representation are used to represent ternarized data values.

In comparison to traditional 32-bit floating point representations, Algorithm 2 is able to achieve an effective compression rate of around 40× for convolution layers and around 200× for fully contented and recurrent layers. One factor that makes Algorithm 2 a robust compress technique is that Algorithm 2 utilizes a self-adjustable threshold. Algorithm 2 applies a compression scheme that sends additional residual gradients that are close to the local maximum in each bin, and can therefore automatically adapt based on the number of important gradients in a mini-batch.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for adaptive residual gradient compression for training of a deep learning neural network (DNN), the computer implemented method comprising:
    obtaining, by a processor of a first learner of a plurality of learners, a current gradient vector for a neural network layer of the DNN, wherein the current gradient vector comprises gradient weights of parameters of the neural network layer that are calculated by training the neural network layer of the DNN using a mini-batch of training data, wherein training the neural network layer of the DNN using the mini-batch of training data comprises:
        receiving the training data comprising a plurality of input samples;
        determining a mini-batch from the training data;
        performing a forward pass and a backward pass through the DNN to calculate a current gradient vector; and
        updating one or more gradient weights for the DNN based on the current gradient vector;
    generating, by the processor, a current residue vector comprising residual gradient weights for the mini-batch, wherein generating the current residue vector comprises summing a prior residue vector and the current gradient vector;
    generating, by the processor, a compressed current residue vector based at least in part on dividing the residual gradient weights of the current residue vector into a plurality of bins of a uniform size and quantizing a subset of the residual gradient weights of one or more bins of the plurality of bins, wherein quantizing the subset of the residual gradient weights is based at least in part on calculating a scaling parameter for the mini-batch and calculating a local maximum of each bin, wherein the uniform size of the bins is a hyper-parameter of the DNN;
    transmitting, by the processor, the compressed current residue vector to a second learner of the plurality of learners; and
    updating, at each of the plurality of learners, the gradient weights of the parameters of the neural network layer.

2. The computer-implemented method of claim 1, wherein generating the compressed current residue vector comprises:
    generating, by the processor, a scaled current residue vector comprising scaled residual gradient weights for the mini batch, wherein generating the scaled current residue vector comprises multiplying the current gradient vector by the scaling parameter and summing the prior residue vector with the multiplied gradient vector;
    dividing the residual gradient weights of the current residue vector into the plurality of bins of the uniform size;
    identifying, for each bin of the plurality of bins, a local maximum of the absolute value of the residual gradient weights of the bin;
    determining, for each residual gradient weight of each bin, that a corresponding scaled residual gradient weight of the scaled residue vector exceeds the local maximum of the bin; and
    upon identifying, for each residual gradient weight of each bin, that the corresponding scaled residual gradient weight of the scaled residue vector exceeds the local maximum of the bin, generating a quantizing value for the give residual gradient weight and updating the current residue vector by substituting the residual gradient weight of the current residue vector with the quantized value.

3. The computer-implemented method of claim 2, wherein the scale parameter is calculated by minimizing quantization error according to L2 normalization.

4. The computer-implemented method of claim 2, wherein:
    the DNN includes one or more convolution network layers; and
    the size of the plurality of bins is set to 50 for the one or more convolution layers.

5. The computer-implemented method of claim 2, wherein:
    the DNN includes at least one of more fully connected layers; and
    the size of the bins is set to 500 for the one or more fully connected layers.

6. A system for adaptive residual gradient compression for training of a deep learning neural network (DNN), the system comprising a plurality of learners, wherein at least one leaner of the plurality of learners is configured to perform a method comprising:
    obtaining a current gradient vector for a neural network layer of the DNN, wherein the current gradient vector comprises gradient weights of parameters of the neural network layer that are calculated by training the neural network layer of the DNN using a mini-batch of training data, wherein training the neural network layer of the DNN using the mini-batch of training data comprises:
        receiving the training data comprising a plurality of input samples;
        determining a mini-batch from the training data;
        performing a forward pass and a backward pass through the DNN to calculate a current gradient vector; and
        updating one or more gradient weights for the DNN based on the current gradient vector;
    generating a current residue vector comprising residual gradient weights for the mini-batch, wherein generating the current residue vector comprises summing a prior residue vector and the current gradient vector;
    generating a compressed current residue vector based at least in part on dividing the residual gradient weights of the current residue vector into a plurality of bins of a uniform size and quantizing a subset of the residual gradient weights of one or more bins of the plurality of bins, wherein quantizing the subset of the residual gradient weights is based at least in part on calculating a scaling parameter for the mini-batch and calculating a local maximum of each bin, wherein the uniform size of the bins is a hyper-parameter of the DNN;

transmitting the compressed current residue vector to a second learner of the plurality of learners; and updating, at each of the plurality of learners, the gradient weights of the parameters of the neural network layer.

7. The system of claim 6, wherein generating the compressed current residue vector comprises:

generating, by the processor, a scaled current residue vector comprising scaled residual gradient weights for the mini batch, wherein generating the scaled current residue vector comprises multiplying the current gradient vector by the scaling parameter and summing the prior residue vector with the multiplied gradient vector;

dividing the residual gradient weights of the current residue vector into the plurality of bins of the uniform size;

identifying, for each bin of the plurality of bins, a local maximum of the absolute value of the residual gradient weights of the bin;

determining, for each residual gradient weight of each bin, that a corresponding scaled residual gradient weight of the scaled residue vector exceeds the local maximum of the bin; and upon identifying, for each residual gradient weight of each bin, that the corresponding scaled residual gradient weight of the scaled residue vector exceeds the local maximum of the bin, generating a quantizing value for the give residual gradient weight and updating the current residue vector by substituting the residual gradient weight of the current residue vector with the quantized value.

8. The system of claim 7, wherein the scale parameter is calculated by minimizing quantization error according to L2 normalization.

9. The system of claim 7, wherein:
the DNN includes one or more convolution network layers; and
the size of the plurality of bins is set to 50 for the one or more convolution layers.

10. The system of claim 7, wherein:
the DNN includes at least one of more fully connected layers; and
the size of the bins is set to 500 for the one or more fully connected layers.

11. A computer program product for adaptive residual gradient compression for training of a deep learning neural network (DNN), the computer program product comprising a computer readable storage medium having program instructions embodied therewith, the program instructions executable by a processor of at least a first leaner of a plurality of learners to cause the first learner to perform a method comprising:

obtaining a current gradient vector for a neural network layer of the DNN, wherein the current gradient vector comprises gradient weights of parameters of the neural network layer that are calculated by training the neural network layer of the DNN using a mini-batch of training data, wherein training the neural network layer of the DNN using the mini-batch of training data comprises:

receiving the training data comprising a plurality of input samples;

determining a mini-batch from the training data;

performing a forward pass and a backward pass through the DNN to calculate a current gradient vector; and updating one or more gradient weights for the DNN based on the current gradient vector;

generating a current residue vector comprising residual gradient weights for the mini-batch, wherein generating the current residue vector comprises summing a prior residue vector and the current gradient vector;

generating a compressed current residue vector based, at least in part, on dividing the residual gradient weights of the current residue vector into a plurality of bins of a uniform size and quantizing a subset of the residual gradient weights of one or more bins of the plurality of bins, wherein quantizing the subset of the residual gradient weights is based at least in part on calculating a scaling parameter for the mini-batch and calculating a local maximum of each bin, wherein the uniform size of the bins is a hyper-parameter of the DNN; and transmitting the compressed current residue vector to a second learner of the plurality of learners; and updating, at each of the plurality of learners, the gradient weights of the parameters of the neural network layer.

12. The computer program product of claim 11, wherein generating the compressed current residue vector comprises:

generating, by the processor, a scaled current residue vector comprising scaled residual gradient weights for the mini batch, wherein generating the scaled current residue vector comprises multiplying the current gradient vector by the scaling parameter and summing the prior residue vector with the multiplied gradient vector;

dividing the residual gradient weights of the current residue vector into the plurality of bins of the uniform size;

identifying, for each bin of the plurality of bins, a local maximum of the absolute value of the residual gradient weights of the bin;

determining, for each residual gradient weight of each bin, that a corresponding scaled residual gradient weight of the scaled residue vector exceeds the local maximum of the bin; and upon determining, for each residual gradient weight of each bin, that the corresponding scaled residual gradient weight of the scaled residue vector exceeds the local maximum of the bin, generating a quantizing value for the residual gradient weight and updating the current residue vector by substituting the residual gradient weight of the current residue vector with the quantized value.

13. The computer program product of claim 12, wherein the scale parameter is calculated by minimizing quantization error according to L2 normalization.

14. The computer program product of claim 12, wherein:
the DNN includes one or more convolution network layers; and
the size of the plurality of bins is set to 50 for the one or more convolution layers.

15. The computer program product of claim 12, wherein:
the DNN includes at least one of more fully connected layers; and
the size of the bins is set to 500 for the one or more fully connected layers.

16. A computer-implemented method for training a deep learning neural network (DNN) via adaptive residual gradient compression, the computer implemented method comprising:
- receiving, by a system comprising a plurality of learners, training data for training of the DNN using one or more neural network layers;
- generating, at each learner of the plurality of learners, a current gradient vector for a neural network layer, wherein the current gradient vector comprises gradient weights of parameters of the neural network layer, wherein the gradient weights of parameters of the neural network layer are calculated by training the neural network layer using a mini-batch of training data, wherein training the neural network layer of the DNN using the mini-batch of training data comprises:
  - receiving the training data comprising a plurality of input samples;
  - determining a mini-batch from the training data;
  - performing a forward pass and a backward pass through the DNN to calculate a current gradient vector; and
  - updating one or more gradient weights for the DNN based on the current gradient vector;
- generating, at each learner of the plurality of learners, a current residue vector comprising residual gradient weights for the mini-batch, wherein generating the current residue vector comprises summing a prior residue vector and the current gradient vector;
- generating, at each learner of the plurality of learners, a compressed current residue vector based at least in part on dividing the residual gradient weights of the current residue vector into a plurality of bins of a uniform size and quantizing a subset of the residual gradient weights of one or more bins of the plurality of bins, wherein quantizing the subset of the residual gradient weights is based at least in part on calculating a scaling parameter for the mini-batch and calculating a local maximum of each bin, wherein the uniform size of the bins is a hyper-parameter of the DNN; and
- exchanging the compressed current residue vectors among the plurality of learners;
- decompressing, at each of the plurality of learners, the compressed current residue vectors; and
- updating, at each of the plurality of learners, the gradient weights of the parameters of the neural network layer.

17. The computer-implemented method of claim 16, wherein generating the compressed current residue vector comprises:
- generating a scaled current residue vector comprising scaled residual gradient weights for the mini batch, wherein generating the scaled current residue vector comprises multiplying the current gradient vector by the scaling parameter and summing the prior residue vector with the multiplied gradient vector;
- dividing the residual gradient weights of the current residue vector into the plurality of bins of the uniform size;
- identifying, for each bin of the plurality of bins, a local maximum of the absolute value of the residual gradient weights of the bin;
- determining, for each residual gradient weight of each bin, hat a corresponding scaled residual gradient weight of the scaled residue vector exceeds the local maximum of the bin; and
- upon determining, for each residual gradient weight of each bin, that the corresponding scaled residual gradient weight of the scaled residue vector exceeds the local maximum of the bin, generating a quantizing value for the residual gradient weight and updating the current residue vector by substituting the residual gradient weight of the current residue vector with the quantized value.

18. The computer-implemented method of claim 17, wherein the scale parameter is calculated by minimizing quantization error according to L2 normalization.

19. The computer-implemented method of claim 17, wherein:
- the DNN includes one or more convolution network layers; and
- the size of the plurality of bins is set to 50 for the one or more convolution layers.

20. The computer-implemented method of claim 17, wherein:
- the DNN includes at least one of more fully connected layers; and
- the size of the bins is set to 500 for the one or more fully connected layers.

21. A system for training a deep learning neural network (DNN) via adaptive residual gradient compression, the system comprising a plurality of learners, wherein the system is configured to perform a method comprising:
- receiving training data for training of the DNN using one or more neural network layers;
- generating, at each learner of the plurality of learners, a current gradient vector for a neural network layer, wherein the current gradient vector comprises gradient weights of parameters of the neural network layer, wherein the gradient weights of parameters of the neural network layer are calculated by training the neural network layer using a mini-batch of training data, wherein training the neural network layer of the DNN using the mini-batch of training data comprises:
  - receiving the training data comprising a plurality of input samples;
  - determining a mini-batch from the training data;
  - performing a forward pass and a backward pass through the DNN to calculate a current gradient vector; and
  - updating one or more gradient weights for the DNN based on the current gradient vector;
- generating, at each learner of the plurality of learners, a current residue vector comprising residual gradient weights for the mini-batch, wherein computing the current residue vector comprises summing a prior residue vector and the current gradient vector;
- generating, at each learner of the plurality of learners, a compressed current residue vector based, at least in part, on dividing the residual gradient weights of the current residue vector into a plurality of bins of a uniform size and quantizing a subset of the residual gradient weights of one or more bins of the plurality of bins, wherein quantizing the subset of the residual gradient weights is based at least in part on calculating a scaling parameter for the mini-batch and calculating a local maximum of each bin, wherein the uniform size of the bins is a hyper-parameter of the DNN; and
- exchanging the compressed current residue vectors among the plurality of learners;
- decompressing, at each of the plurality of learners, the compressed current residue vectors; and
- updating, at each of the plurality of learners, the gradient weights of the parameters of the neural network layer.

22. The system of claim 21, wherein generating the compressed current residue vector comprises:
- generating a scaled current residue vector comprising scaled residual gradient weights for the mini batch, wherein generating the scaled current residue vector comprises multiplying the current gradient vector by the scaling parameter and summing the prior residue vector with the multiplied gradient vector;
- dividing the residual gradient weights of the current residue vector into the plurality of bins of the uniform size;
- identifying, for each bin of the plurality of bins, a local maximum of the absolute value of the residual gradient weights of the bin;
- determining, for each residual gradient weight of each bin, that a corresponding scaled residual gradient weight of the scaled residue vector exceeds the local maximum of the bin; and
- upon determining, for each residual gradient weight of each bin, that the corresponding scaled residual gradient weight of the scaled residue vector exceeds the local maximum of the bin, generating a quantizing value for the residual gradient weight and updating the current residue vector by substituting the residual gradient weight of the current residue vector with the quantized value.

23. The system of claim 22, wherein the scale parameter is calculated by minimizing quantization error according to L2 normalization.

24. The system of claim 22, wherein:
- the DNN includes one or more convolution network layers; and
- the size of the plurality of bins is set to 50 for the one or more convolution layers.

25. The system of claim 22, wherein:
- the DNN includes at least one of more fully connected layers; and
- the size of the bins is set to 500 for the one or more fully connected layers.

* * * * *